United States Patent [19]

Marcillat et al.

[11] Patent Number: 5,059,882
[45] Date of Patent: Oct. 22, 1991

[54] ELECTROMECHANICAL CONTROL DEVICE USABLE FOR PILOTING A VEHICLE

[75] Inventors: Gérard Marcillat; Jean-Pierre Mota, both of Chatellerault, France

[73] Assignee: Sextant Avionique, France

[21] Appl. No.: 530,697

[22] Filed: May 30, 1990

[30] Foreign Application Priority Data

May 31, 1989 [FR] France .................................. 89 07492

[51] Int. Cl.[5] ........................................... G05B 11/01
[52] U.S. Cl. ..................... 318/675; 338/128; 364/190; 200/6 A
[58] Field of Search ............... 200/6 A; 318/560, 575, 318/675; 338/68, 128; 364/190

[56] References Cited

U.S. PATENT DOCUMENTS

| 4,580,210 | 4/1986 | Nordstrom | 364/190 |
| 4,763,100 | 8/1988 | Wood | 338/128 |
| 4,772,836 | 9/1988 | Godon | 318/675 |
| 4,849,583 | 7/1989 | Meyer | 338/128 |

*Primary Examiner*—William M. Shoop, Jr.
*Assistant Examiner*—Larry Moskowitz
*Attorney, Agent, or Firm*—William A. Drucker

[57] ABSTRACT

An electromechanical control device is disclosed usable for piloting a vehicle, comprising a piloting control stick articulated on a support via an articulation with two degrees of freedom and so with two output axes, a detection assembly comprising position sensors associated with each of these axes, two electromechanisms acting on the axes via two respective transmission devices, so as to oppose to the movements of the control stick resistant forces in accordance with a predetermined force law. The transmission device comprises a resilient connection disposed in series.

6 Claims, 2 Drawing Sheets

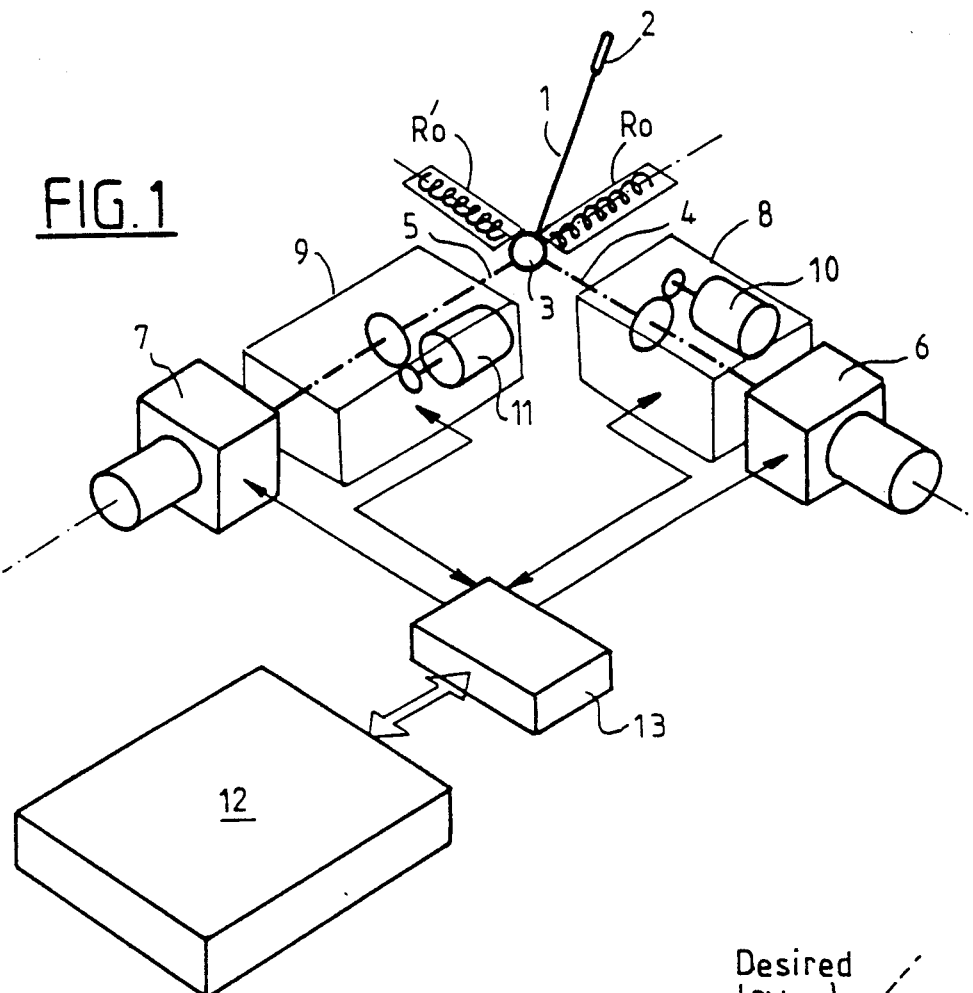
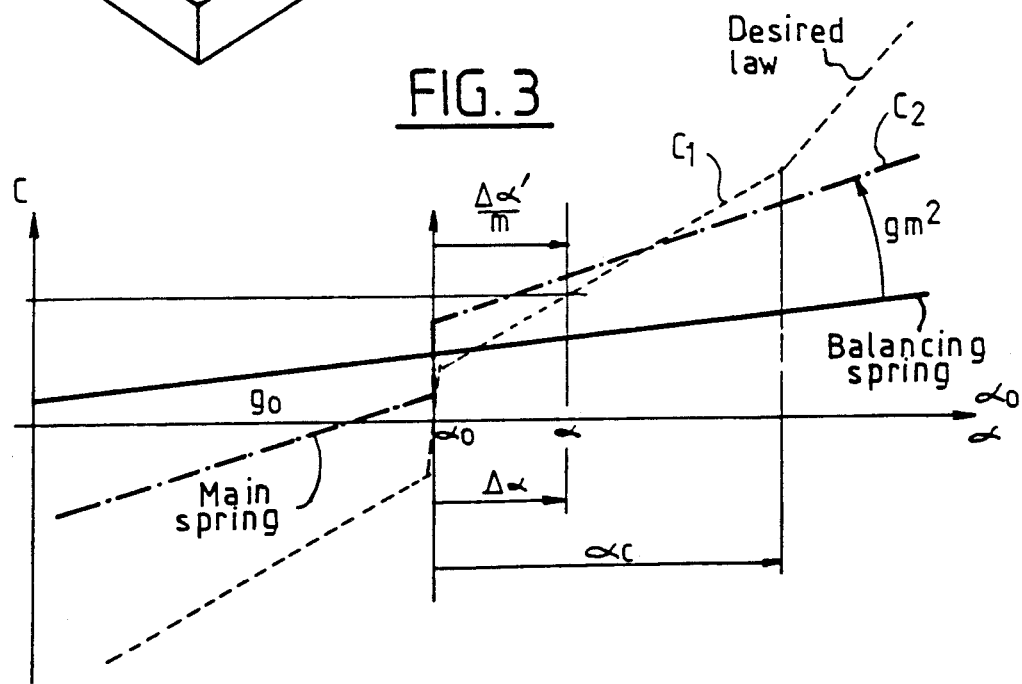

ELECTROMECHANICAL CONTROL DEVICE USABLE FOR PILOTING A VEHICLE

BACKGROUND OF THE INVENTION

The present invention relates to an electromechanical control device usable for piloting a vehicle, such for example as an aircraft.

Generally, the use of electric flight controls on aircraft leads to transferring to the level of the piloting control sticks two essential functions, namely:

the creation of a resistant force (artificial sensation function), the fixing of the neutral point of this resistant force in a given position of the course of the control stick (trim function).

In mechanical control devices, these functions are the most often provided by a device placed in parallel across the control gear (trim and force sensation actuator).

Of course, these same functions are to be provided, generally with different characteristics, along the two axes (longitudinal and lateral) of each control stick, whose positions measured by sensors form the piloting orders whether by position or speed control (or integral control).

Furthermore, to take external conditions into account (e.g. the speed) these control devices must comprise means for varying in flight some characteristics of the force law applied to the control stick so as to obtain the most appropriate feeling of resistant force.

The electric control devices used on aircraft more particularly comprise:

a piloting control stick one end of which is provided with a plurality of control knobs ("trim Christmas tree", declutching and priority) and the other end of which is articulated to a support by means of an articulation device with two degrees of freedom, which therefore has two output axes corresponding respectively to rolling and pitching;

a detection assembly comprising one or more position sensors associated with each of these axes;

two electromechanisms adapted so as to oppose to the movements of the control stick a given resistant force (resilient or viscous), these two electromechanisms being usually connected to the roll and pitch axes, either directly or via a transmission device; and an electronic circuit for controlling the assembly which receives orders from a computer and transmits useful information thereto.

Like the above mentioned mechanical control devices, these electric control devices must be designed so as to guarantee a maximum of safety, particularly by limiting the non catastrophic breakdowns (degraded operation) and preventing catastrophic breakdowns.

Thus, in electric control devices of the type described above, the safety means against the risks of jamming or defective operation of the electromechanisms serving for generating the desired force law, generally comprise a clutch mounted in the transmission device connecting the control stick to each of these electromechanisms, this clutch in particular makes it possible to release the control stick on reception of a control signal emitted following the detection of an anomaly present at the level of the electromechanism and of the electronic circuits which are associated therewith.

It has however proved that such safety devices remain imperfect and do not allow all the operating anomalies to be palliated, to which a control device may be susceptible. Such is the case particularly when the following occur:

jamming of the transmission device associated with an electromechanism (including mechanical jamming at the level of the clutch), erroneous operation of the control and servo-control electronic circuits for the electromechanisms, a defect of the circuit controlling the clutch.

The object of the invention is then more particularly to overcome the risks engendered by such anomalies.

SUMMARY OF THE INVENTION

For this, it provides an electric control device of said type in which the transmission device connecting the control stick to each of the electromechanisms comprises a resilient connection disposed in series.

Advantageously, this device may further comprise means for measuring the deformation of said resilient connection as well as means for determining the value of the force exerted on the control stick by each of the electromechanisms from the measured value of said deformation.

The control of each of the electromechanisms may then be provided by a servo-control device generating a control signal representative of the difference of the value of the force exerted on the control stick (such as previously determined) and a reference value elaborated by a computer according to a force law, as a function of the position of the control stick.

BRIEF DESCRIPTION OF THE DRAWINGS

One embodiment of the invention will be described hereafter, by way of non limitative example, with reference to the accompanying drawings in which:

FIG. 1 is a schematic representation illustrating the general structure of a device for the electric flight control of an aircraft (ministick);

FIG. 3 is a diagram showing the variation of the resistant torque applied to the control stick by one of the kinematic connections, according to a force law determined as a function of the angular position of the control stick, as well as the variation of the main forces coming into play for generating this torque.

DESCRIPTION OF THE PREFERRED EMBODIMENT

Figure 2:
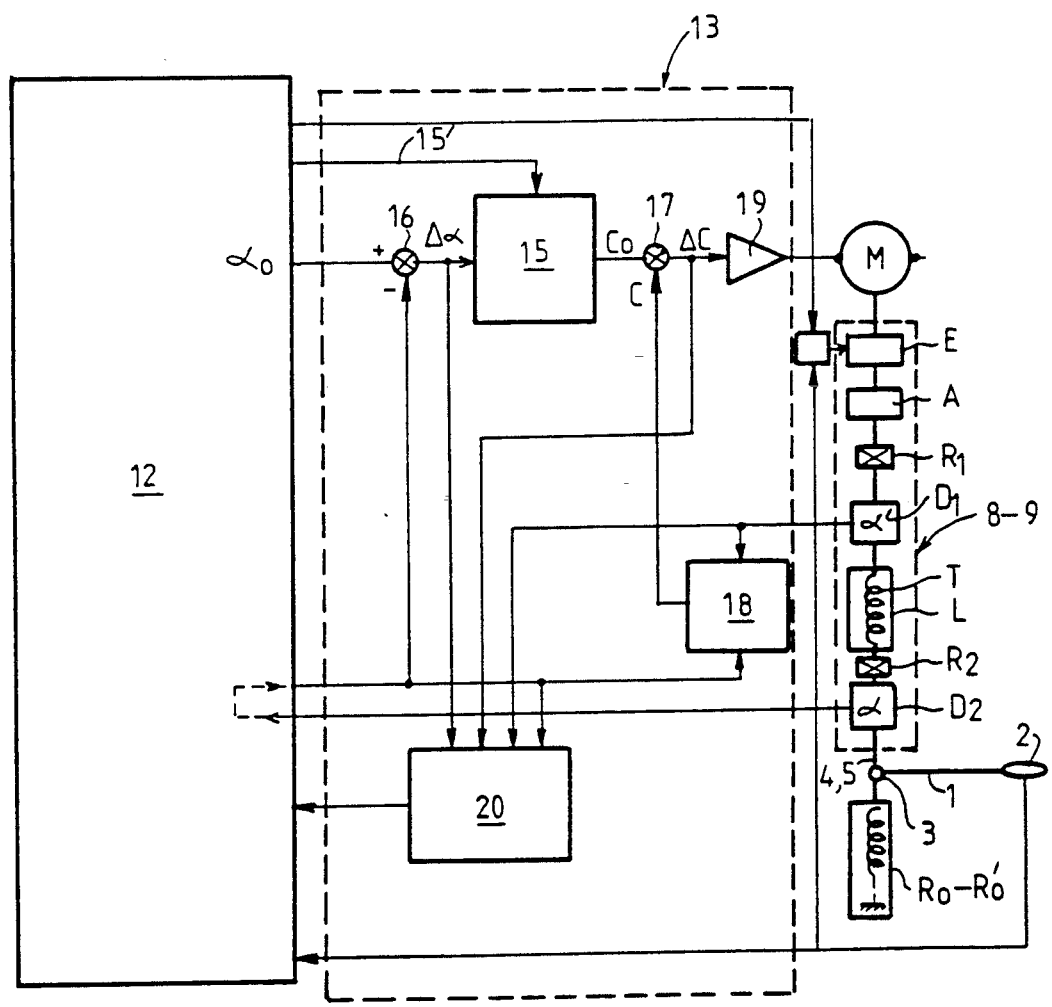
FIG. 2 is a block diagram of the kinematic connection between the stick and one of the electromechanisms serving for generating a resistant force variable according to a force law, this figure further representing schematically the electronic circuits associated with this connection.

Such as shown in FIG. 1, the electric control device comprises a control stick 1, one end of which has a handle 2 which can be equipped with the usual control knobs ("trim Christmas tree", declutching and priority) and the other end of which is articulated to a support via an articulation device 3 with two degrees of freedom which has therefore two output axes 4, 5, one of these axes corresponding to rolling whereas the other corresponds to pitching.

This control stick 1 is coupled to two electromechanisms 6, 7 which may each comprise for example a motor-driven reducer so as to oppose a given resistant force (resilient or viscous) to the movements of control stick 1.

These two electromechanisms 6, 7 are connected respectively to two axes 4, 5 of the control stick 1 via two respective transmission devices 8, 9, shown here schematically by two blocks.

The angular position of control stick 1 is detected by two sensors 10, 11, coupled respectively to the two output axes (or to an element of the transmission devices 8, 9 associated with these axes).

This device is controlled by a computer 12 via an electric control and detection circuit 13 which controls the electromechanisms 6, 7 as well as the control elements for the transmission devices 8, 9 and which receives information relative to the useful parameters detected at the level of control stick 1 and of the transmission devices 8, 9.

In the embodiment shown in FIG. 2, the electromechanism associated with each of the output axes of the articulation of the control stick consists of a DC motor M, which may advantageously be of the self-synchronous type (without brushes). It is coupled to axis 4 or 5 via a rotary transmission device comprising successively, from the motor:

a clutch E with electric control of the current demand type (declutched in the absence of a supply current);

an eddy current damper A;

a first step-down reducer $R_1$ having a step-down ratio $r_1$;

a resilient connection L which may for example consist of a torsion spring T (having a prestress P and stiffness g) one end of which is connected to the output shaft of reducer $R_1$;

a second reducer $R_2$ having a reduction ratio $r_2$ whose input shaft is connected to the second end of the resilient connection L and whose output shaft is coupled to the output axis 4, 5 of the control stick 1.

In this example, the angular positions of the output shafts of reducers $R_1$, $R_2$ are respectively measured by two detectors $D_1$, $D_2$. Furthermore, the control stick 1 is returned to a central position by two springs $R_0$, $R'_0$ having a prestress $P_0$, $P'_0$ and stiffness $g_0$, $g'_0$ applying respectively a relatively low torque to the two output axes 4, 5 of the articulation 3 (this device is necessary for controlling the control surfaces in speed or in integral control, degraded mode, if this type of piloting is provided).

It is clear from the previously described structure that the control device makes it possible to oppose to the movements of the control stick 1 forces of a resilient nature generated by a combination of electromechanical means (motor M) and purely mechanical means (resilient means L).

The prestress p of spring T generates a threshold which is transferred to the output axes 4, 5 of articulation 3 (desired threshold) to which is added the friction generated in articulation 3.

The characteristics of spring T and reducer $R_2$ being known, the values measured by detectors $D_1$, $D_2$ (whose difference is representative of the angular deformation of spring T) make it possible to compute the torque transmitted to the axis 4, 5 by the transmission device 8, 9.

Clutch E in particular allows the control stick 1 to be freed of the resistant torque exerted by motor M, in the case of a malfunction of the latter. In this case, damper A further guarantees a certain piloting quality.

To this safety function is added the one conferred by spring T in the case of jamming of motor M and/or of the part of the transmission device situated upstream of this spring T.

In this case, actuation of control stick 1 remains possible and is effected with a resistant force essentially due to the action of the spring.

As mentioned above, motor M (which here forms said electromechanism) is fed with power so as to generate a resistant torque which varies as a function of the angular position $\alpha$ of control stick 1 in accordance with a predetermined force law.

In this example, the force law is determined by an electronic circuit 15 which delivers a signal $C_0$ representative of the torque which must be exerted on the output axis 4, 5 of the articulation 3 of control stick 1, as a function of the angular position $\alpha$ of control stick 1 measured by detector $D_2$ and different orders coming in particular from the piloting system (connection 15' with the computer 12). In fact, the signal $\alpha$ emitted by detector $D_2$ is applied to one of the inputs of a subtracter 16 whose other input receives a reference signal $\alpha_0$ by computer 12. This subtracter 16 delivers then a signal $\Delta\alpha = \alpha_0 - \alpha$ which is applied to circuit 15.

The signal $C_0$ delivered by circuit 15 is transmitted, as reference value, to one of the inputs of a subtracter 17 which receives at its other input a signal C representative of the torque transmitted to the output axis 4, 5 of articulation 3 of control stick 1 by the transmission device 8, 9.

This signal C is itself provided by a computing circuit 18 as a function of the angular values $\alpha$, $\alpha'$ detected by detectors $D_1$, $D_2$ and of the characteristics of spring T.

The error signal $\Delta C$ delivered by subtracter 17 is then applied to motor M after amplification by a power amplifier 19.

Thus, a servo-control of motor M is obtained with two successive servo-control loops (angular position/torque) which allows a relatively complex force law to be used, for example of resilient type or viscous type.

FIG. 3 shows by way of example a force law $C_1$ of resilient type with two slopes, as well as the different torques taken into account for obtaining this force law, in particular the torque $C_2$ exerted by the main spring T and the torque generated by the balancing spring $R_0$. The reference torque $C_0$ is here provided from the difference $\Delta\alpha = \alpha_0 - \alpha$ by the computing circuit 15, which may be either analog or digital. All the characteristic parameters of this law may be controlled from outside.

In the case where the force law is of viscous type, reference $\alpha_0$ remains equal to 0. Only the law for elaborating the torque reference is different. We have in effect:

$$C = C_0 + g_0\alpha = Z\dot\alpha$$

Z being the desired damping. Whence the law for elaborating the torque:

$$C_0 = Z\dot\alpha - g_0\alpha$$

Of course, the necessary derivation will be imperfect, and of the form $$\frac{\dot\alpha}{1 + \tau s}$$

with $\tau$ close to 1 ms.

The new function to be provided is derived therefrom:

$$C_0 = -g_0 \frac{1 + \left(1 - \frac{Z}{g_0}\right)s}{1 + \tau s}$$

If the compensation of the balancing spring is perfect, the control stick remains in the position where it is left, provided that its speed is zero.

As mentioned above, from the outset the system is designed to eliminate the possibilities of catastrophic breakdowns. The main arrangements leading to this result are given below.

1) OPERATION WITH FORCE CUT-OFF

In this case, the clutch is not fed with power and the control of the motor is inhibited.

The control stick is returned to zero by the balancing spring. It benefits from the damping provided by the eddy current damper A, through the main spring T.

This case corresponds of course to a degraded operating mode.

2) LOSS OF POSITION INFORMATION

From the electric point of view, it is clear that the problem is solved by using four independent chains on each axis.

From the mechanical point of view, detectors are disposed as close to the control stick 1 as possible. The four detectors of an axis are not driven by the same means: two double detectors may however be admitted, driven by two different wheels.

3) MECHANICAL JAMMING

This is the profound reason for using the spring which makes it possible to override any jamming upstream in the chain. In addition, if the jamming takes place at the level of the motor, the forces may still be cancelled out by declutching.

Jamming in the main spring T itself, which thus loses its resilience, is felt immediately by the pilot who is thus led to declutch the mechanism.

Jamming at the level of the articulation or the balancing spring is the only catastrophic cause of jamming. Whatever the solution adopted, it cannot be eliminated. Consequently, it is necessary for the design itself and, in particular, the simplicity of the device, to practically prohibit any risk of jamming (probability of the order of $10^{-8}$ to $10^{-9}$ per hour of flight).

The balancing spring could moreover be omitted in the case where a degraded integral control mode is not required: in fact, this situation could possibly be replaced by passing to position control.

4) BREAKAGE OF THE CHAIN

Provided that the breakage occurs upstream of the detectors $\alpha$, no disastrous consequence results. The situation is that of cancellation of forces. The case of breakage at the level of the detectors leads back to paragraph 2.

5) ELECTRONIC BREAKDOWNS

Precautions are taken against electronic breakdowns, leading among other things to racing of the motor, by carrying out coherence checks on certain internal parameters.

It may be noted that in normal operation :

a) the difference term $\Delta C = C_0 - C$ of the torque servo-control must be close to zero;

b) whether the control stick is piloted or not, the torque applied to control stick 1 is cancelled out at the same time as the difference $\alpha_0 - \alpha$.

Therefore, if we designate by X, Y and Z the following logic functions:

$$X \rightarrow |C_0 - C| > E1$$

$$Y \rightarrow |C| > E2,$$

this torque C being calculated by the formula:

$$C = P_0 \text{sign } \alpha_0 + g_0 \alpha + mg \ (m\alpha - \alpha')$$

$$Z \rightarrow |\alpha_0 - \alpha| > E3$$

We may use as defect signal the following function:

$$DEF = X + Y\bar{Z} + Z\bar{Y}$$

The E, E1 and E2 are small quantities to be optimized.

In the example shown in FIG. 1, the device is further completed by a monitoring device 20 which permanently monitors the values of the position error signal $\Delta \alpha$, of the torque error signal $\Delta C$ as well as the relative values of the angles $\alpha$, $\alpha'$ measured by detectors $D_1$, $D_2$ and the value of the reference signal $\alpha_0$. This monitoring device is designed so as to transmit, when an anomaly occurs in the above parameters, a defect signal which is transmitted to the control computer 12 of the whole of the device. Following transmission of this defect signal, computer 12 orders the interruption of the electric current supply to clutch E, so as to cause declutching. In this case, the servo-control device no longer plays a role and the damper further guarantees a certain quality of piloting.

What is claimed is:

1. An electromechanical control device usable for piloting a vehicle, this device comprising:

a piloting control stick articulated to a support by means of an articulation device with two degrees of freedom which therefore has two output axes;

a detection assembly comprising one or more position sensors associated with each of these axes;

two electromechanisms acting respectively on said axes via two respective transmission devices, so as to oppose, to the movements of the control stick, resistant forces in accordance with a predetermined force law, wherein each of the transmission devices comprises a resilient connection disposed in series, and each of said electromechanisms is controlled by a servo-control device generating a control signal representative of the difference between the value of the force exerted on the control stick by the electromechanism and a first reference value delivered by a computer according to force law, as a function of the position of the control stick and the value of the force exerted on the control stick by said electromechanism is determined as a function of the values measured by the detectors which measure the deformations of the resilient connection.

2. The device as claimed in claim 1, wherein said first reference value is formed as a function of the difference between a value representative of the position of the control stick and a reference value.

3. The device as claimed in claim 1, wherein said electromechanism comprises a motor adapted to generate a torque on a corresponding output axis of the articulation of the control stick, and said transmission device comprises successively, from the motor:
- a control clutch with electric control of current demand type,
- an eddy current damper,
- a first reducer,
- a torsion spring forming said resilient connection,
- a second reducer whose output shaft is coupled to the output axis of the articulation of the control stick.

4. The device as claimed in claim 3, wherein said two detectors determine the angular difference between the two ends of the spring and it comprises means for determining, from this angular difference, the torque applied to the control stick by the transmission device.

5. The device as claimed in claim 3, comprising means for detecting an operating defect of the servo-control device and means for causing declutching of the transmission device when a defect has been detected.

6. The device as claimed in claim 1, wherein the control stick is urged by a balancing spring.

* * * * *